July 27, 1965 | M. R. KRAMER | 3,197,747

APERTURED FERRITE DEVICE

Filed Sept. 29, 1960 | 3 Sheets-Sheet 1

INVENTOR.
Martin R. Kramer
BY
Henry L. Shenier
ATTORNEY

July 27, 1965 M. R. KRAMER 3,197,747

APERTURED FERRITE DEVICE

Filed Sept. 29, 1960 3 Sheets-Sheet 2

INVENTOR.

Martin R. Kramer

BY [signature]

ATTORNEY

July 27, 1965 M. R. KRAMER 3,197,747

APERTURED FERRITE DEVICE

Filed Sept. 29, 1960 3 Sheets-Sheet 3

INVENTOR.

BY Martin R. Kramer

ATTORNEY

United States Patent Office 3,197,747

Patented July 27, 1965

3,197,747

APERTURED FERRITE DEVICE

Martin R. Kramer, Jackson Heights, N.Y., assignor to United Aircraft Corporation, East Hartford, Conn., a corporation of Delaware Filed Sept. 29, 1960, Ser. No. 59,243
9 Claims. (Cl. 340—174)

My invention relates to an apertured ferrite device and more particularly to an information storage device in which data permanently, mechanically incorporated in a record medium can be read without mechanical contact between relatively movable members.

Many types of devices for storing information are known in the prior art. In one type of such a device a member moves over the surface of the record medium in contact with the surface to read the information from the record. This type of device embodies all the defects inherent in devices in which contact must be made between relatively movable members. The contacting members wear relatively rapidly so as to have a short life. Further the contacts may become dirty and worn with the result that information is not correctly read from the storage medium.

In another kind of information storage device used in the prior art a magnetic medium is magnetized in a predetermined pattern representing the information. When the information is to be read, magnetic pickup devices are moved over the medium to cause electrical signals to be induced in the pickup devices as they move over record spots. While devices of this type do not embody the defects inherent in arrangements requiring contact between relatively movable members, the record thus provided is not as permanent as is desirable in many instances. That is, where such a magnetized record medium is subjected to strong temporary magnetic fields, the record carried by the medium may be destroyed in whole or in part. It may be also that where the medium is subjected to strong shock forces the magnetized record will be adversely affected. The magnetic reading devices generally employed in this type of information storage device do not readily lend themselves to use with a record medium which is packaged in any other form than a sheet or a tape.

I have invented an apertured ferrite device which overcomes defects of information storage devices of the type described hereinabove. My device carries information which is permanently, mechanically incorporated in a record medium. Information stored in the record medium may be read by passing a reading member over the record without the necessity of making contact between the record medium and the reading member. Owing to the fact that information is permanently, mechanically incorporated in the record medium, the information contained therein is not destroyed when the record medium is temporarily subjected to strong magnetic fields. Neither is the information contained in the record medium adversely affected by shock forces. My record medium readily lends itself to unusual packaging configurations such as may be desirable in certain installations.

One object of my invention is to provide an apertured ferrite device which overcomes the defects of information storage devices of the type known in the prior art.

Another object of my invention is to provide an apertured ferrite device for storing information which may be read from the device without the necessity of making contact between two relatively movable members.

A further object of my invention is to provide an apertured ferrite device in which information is permanently, mechanically incorporated so as not to be affected by extraneous temporary magnetic fields or by shock forces.

Yet another object of my invention is to provide an apertured ferrite device which readily lends itself to unusual packaging configurations.

Other and further objects of my invention will appear from the following description.

In general my invention contemplates the provision of an apertured ferrite device in which a sheet of magnetic material such as ferrite is provided with a plurality of holes forming saturable toroids, each one of which has associated therewith a readout winding which normally is inductively coupled by the sheet to an interrogating winding to which an electrical signal is applied. In reading the information incorporated in the sheet, I move permanent magnets past the toroids to saturate the toroids to reduce the coupling between the readout and interrogating windings to a point at which the interrogating signal induces no signal in the readout winding. By a predetermined arrangement of holes carrying windings, the sheet may be coded as desired to produce a readout of the information as the magnets move past the holes.

In the accompanying drawings which form part of the instant specification and which are to be read in conjunction therewith and in which like reference numerals are used to indicate like parts in the various views.

Figure 1:
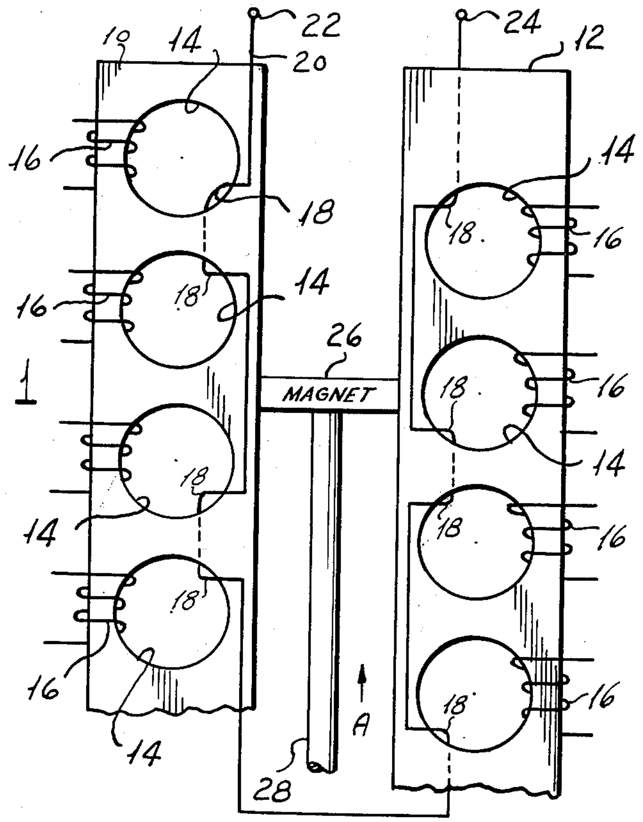
FIGURE 1 is a schematic view of one form of my apertured ferrite device.

Referring now to FIGURE 1 of the drawings, one form of my apertured ferrite device includes two or more spaced strips 10 and 12 of a suitable magnetic material which saturates at a low flux density such, for example, as ferrite. As is known in the art ferrite is made up of ceramic ferromagnetic material defined by the formula $XFe_2O_4$ where X is a divalent metallic ion having the proper structure to fit the crystal lattice; i.e. cobalt, nickel, cadmium, zinc etc. I provide each strip 10 and 12 with a plurality of holes or apertures 14 spaced along the length of the strip. In the particular form of my device shown in FIGURE 1, I so arrange the strips 10 and 12 that the holes 14 of the strip 10 are staggered with reference to the holes 14 of the strip 12. It will be appreciated that each of the holes 14 in effect forms a saturable flux path, core or toroid in its associated strip 10 or 12. I wind readout windings 16 on the strips 10 and 12 with one readout winding associated with each of the holes 14. I provide the device shown in FIGURE 1 with a plurality of serially-connected interrogating windings 18, one of which is associated with each aperture 14. Most conveniently, the windings 18 may be formed by passing a length of a conductor 20 extending between terminals 22 and 24 alternately down through one aperture 14 and then up through the next aperture 14 in the manner shown in FIGURE 1.

I dispose a permanent magnet 26 carried by a shaft 28 in the space between the strips 10 and 12. Shaft 28 is adapted to be moved in the direction of the arrow A in FIGURE 1 alternately to position the magnet 26 adjacent an aperture 14 in strip 10 and adjacent an aperture 14 in strip 12.

Figure 2:
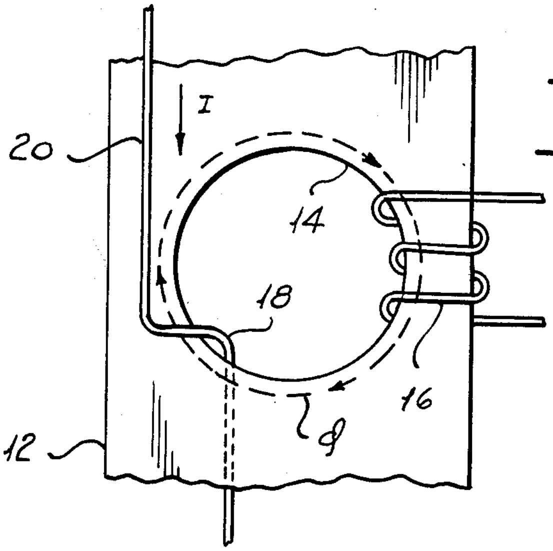
FIGURE 2 is a fragmentary schematic view illustrating the principle embodied in my apertured ferrite device.

Referring now to FIGURE 2, I have illustrated the principle embodied in my apertured ferrite device. As can be seen by reference to the figure, when conductor 20 carries a current flowing in the direction of the arrow I the winding or turn 18 associated with the aperture 14 produces a magnetic flux as indicated by the broken lines in FIGURE 2. The toroid formed in the strip 12 by the aperture 14 normally links the flux to the windings 16 carried by the strip 12 and associated with the aperture 14. In response to an alternating current interrogating signal passing through the turn 18 a signal is induced in the windings 16. If, however, the permanent magnet 26 is disposed adjacent the toroid formed by the aperture 14 in FIGURE 2 the strip 12 in the area of the toroid will be saturated with the result that the interrogating signal on the winding 18 will induce no output in the readout winding 16. Thus, as shaft 28 moves in the direction of the arrow A in FIGURE 1, the toroids in the respective strips 10 and 12 alternately will be saturated to indicate the position of the magnet 26, and thus of the shaft 28. It will be appreciated that I may bring the windings 16 individually to an output or indicating circuit with the result that the particular windings 16 carrying no signal can be identified to indicate the position of magnet 26. Alternatively, I may connect the readout windings in series and count the number of variations as the magnet moves past the apertures to afford an indication of the position of the magnet 26.

Figure 3:
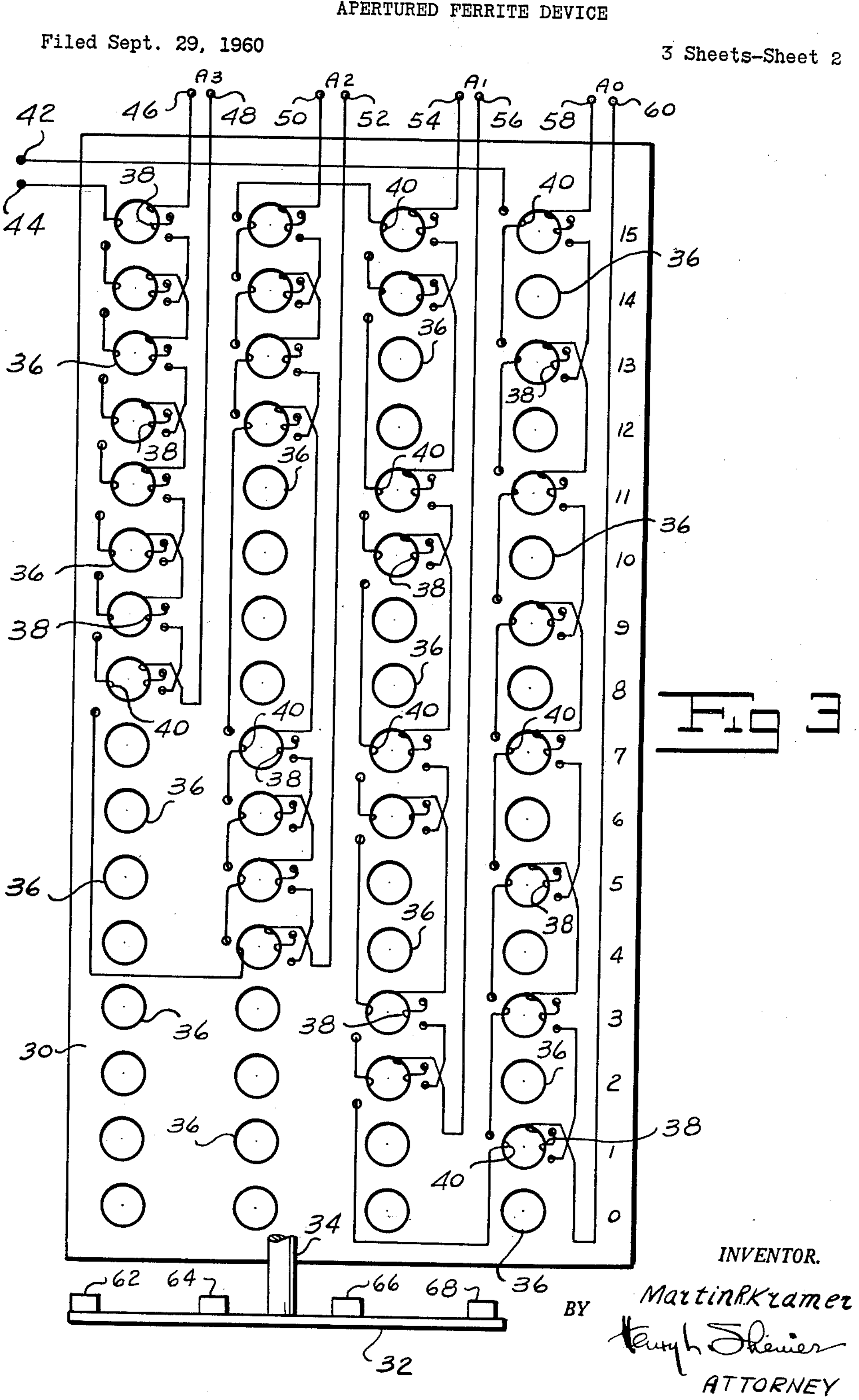
FIGURE 3 is a plane view illustrating another form of my apertured ferrite device.

Referring now to FIGURE 3, I have shown by way of example a form of my apertured ferrite device in which a sheet 30 formed of a suitable magnetic material such as ferrite is coded to provide a binary coded output representation as a readout member 32 carried by a shaft 34 passes over the sheet 30. I provide the sheet 30 with a plurality of apertures 36 arranged in columns extending along the length of the sheet 30 and in rows extending across the sheet. I provide certain ones of the apertures 36 with readout windings 38 and I provide each aperture 36 carrying a readout winding 38 with an interrogating winding 40. I provide windings 38 for only those apertures 36 which will produce the desired result in a manner to be described. I connect all the interrogating windings 40 in series between terminals 42 and 44 to which the interrogating signal is applied. It is to be noted that in the form of my invention shown in FIGURE 3 all the interrogating windings are of the same sense. With this arrangement, as will be explained hereinafter, I connect the readout windings 38 associated with a particular column in series with adjacent windings in the opposite sense in order that the normal output from each channel represents a digital "0." I connect the readout windings 38 of one column of apertures 36 in series between terminals 46 and 48 with alternate windings connected in opposed relationship to give the most significant bit $A_3$ of the output representation. In a similar manner I connect all the readout windings 38 of another column of apertures 36 between terminals 50 and 52 to give the next-to-most significant bit $A_2$. The windings 38 of a third column are connected in series with alternate windings in opposed relationship between terminals 54 and 56 to give the next-to-least significant bit $A_1$ of the output representation. I connect the windings 38 of the last column in series with alternate windings in opposed relationship between terminals 58 and 60 to give the least significant bit $A_0$ of the output representation. I mount four permanent magnets 62, 64, 66, and 68 in spaced relationship on the member 32 in positions at which they pass adjacent to the respective apertures 36 of the columns of apertures on sheet 30 as the member 32 moves past the rows of apertures. It will be noted that there are an even number of readout windings 38 in each of the columns of apertures on the sheet 30. As a result, with no magnet adjacent an aperture carrying windings, the output of the channel associated with that column will be "0." If, however, a magnet is disposed adjacent an aperture carrying a winding, then the output of that channel will be the output of a single winding.

As is explained hereinabove, I associate windings 38 with apertures 36 in such a manner as to provide a binary coded representation at the pairs of output terminals 46 and 48, 50 and 52, 54 and 56, and 58 and 60. For example, with the shaft 34 in such a position that the magnets 62, 64, 66, and 68 are adjacent the apertures 36 of the sixth row of apertures, then terminals 58 and 60 carry no output indicating that the least significant bit $A_0$ of the output representation is "0." At the same time the magnet 66 associated with the next-to-least significant column is adjacent an aperture carrying a winding so that the output at terminals 54 and 56 indicates that the next-to-least significant bit $A_1$ is a "1." Similarly, the magnet 64 associated with the next-to-most significant column is adjacent an aperture carrying a winding with the result that terminals 50 and 52 carry an output signal indicating that the next-to-most significant bit $A_3$ is a "1." Since, when the magnets are adjacent the apertures in the sixth row winding 62 is adjacent an aperture carrying no winding, then the output at terminals 46 and 48 indicates that the most significant output bit $A_3$ is a "0." As a result of this operation just outlined, with the magnets adjacent the apertures of the sixth row the pairs of terminals 46 and 48, 50 and 52, 54 and 56, and 58 and 60 carry an output representation 0110 which, as is known in the art, indicates the number 6 in the binary code.

The same analysis can be carried through for any position of the carrier 32 on which the magnets are mounted. It will be understood that while I have shown an aperture 36 at each point of intersection of a row and a column of the sheet 30, I need only provide apertures for those positions at which output windings 38 must be provided to give the desired output representation.

Figure 4:
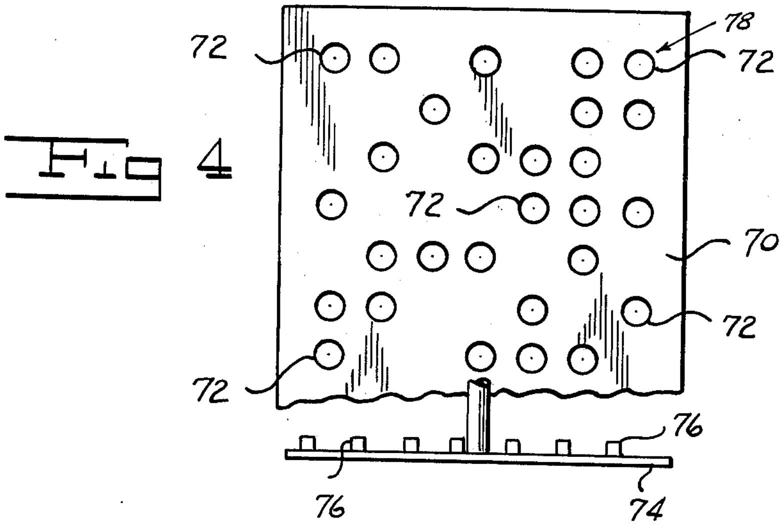
FIGURE 4 is a schematic view illustrating still another form of my apertured ferrite device with the windings removed.

Referring now to FIGURE 4, I have shown a sheet 70 provided with apertures 72 formed in the sheet 70 at locations such as to provide any desired digital output representation as a member 74 carrying magnets 76 associated with the respective columns of apertures on the sheet 70 moves past the rows of apertures on sheet 70. As is explained hereinabove, when the windings are serially-connected in such manner as to provide an output signal which normally is "0" in the output channel associated with a particular column, there must be an even number of readout windings in the column. It is for this reason that in the form of my invention shown in FIGURE 4 I provide the sheet 70 with an extra or parity row indicated generally by the reference character 78 of the apertures 72 carrying winding (not shown). This row has apertures 72 carrying windings in such positions as will ensure that there is an even number of apertures 72 in any column of the sheet 70. It will be seen that for purposes of clarity I have indicated apertures 72 in the sheet 70 only in those positions which have significance. Further, I have not shown the readout or interrogating windings associated with this sheet, though it will be understood that these will be wound as shown in FIGURES 1 to 3. Since I do not rely on magnetized areas to provide the coded output, the information is not erased when the sheet is subject to stray magnetic fields.

Figures 5, 6:
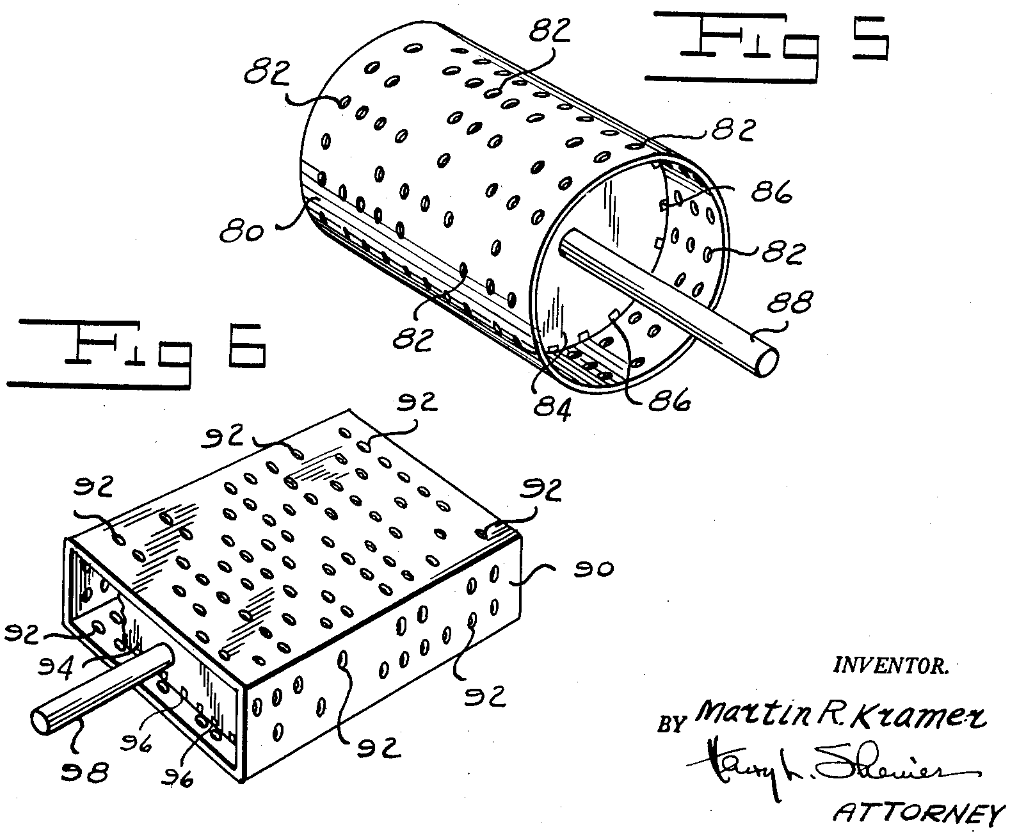
FIGURE 5 is a perspective view illustrating an alternate packaging configuration of my apertured ferrite device with the windings removed.
FIGURE 6 is a perspective view illustrating yet another packaging configuration of my apertured ferrite device with the windings removed.

As is pointed out hereinabove, my apertured ferrite device readily lends itself to rather unusual configurations such as may be desirable in certain instances. Referring now to FIGURE 5, I have shown an arrangement in which a cylindrical package 80 formed of a suitable material such, for example, as a ferrite sheet is provided with coded apertures having windings associated therewith. I arrange the apertures in axially extending columns and in circumferential rows. Again, for purposes of clarity I have not shown the windings associated with the apertures 82. It will readily be understood that where intersection of a row and a column has an aperture then only certain ones of the apertures carry windings to provide the desired output. Alternatively, apertures may be provided only in those places which have significance. In the form of my invention shown in FIGURE 5 a piston 84 disposed within the cylinder 80 carries a plurality of magnets 86 associated with the axially extending columns of apertures. A rod 88 may be moved axially of the cylinder 80 to move the plunger to provide readout in this form of our invention.

Referring now to FIGURE 6, I have shown yet another form of my invention in which I form a ferrite sheet to a configuration providing a housing 90 of rectangular configuration coded with apertures 92. A plunger 94 disposed with the housing carries magnets 96 associated with columns of apertures extending in the direction of the length of the housing 90. For purposes of clarity I have not shown windings in this form of my device, it being understood that they will be provided as shown in FIGURES 1 to 3. A rod 98 may be moved axially of the housing to cause the readout to be obtained.

In operation of the form of my invention shown in FIGURE 1, as the magnet 26 moves in the direction of the arrow A, the toroids formed by apertures 14 of the respective strips 10 and 12 alternately are saturated in succession with the result that the respective readout windings 16 associated therewith produce output signals. With an even number of readout windings provided and connected in series, the normal output of the device will be "0" since successive interrogating windings 18 in the direction of the length of conductor 20 are of the opposite sense. In order to indicate shaft position with this arrangement, the number of pulses produced as the magnet 26 moves can be counted. Alternatively, the readout windings 16 could be brought out separately and that winding having no single thereon would indicate the position of the shaft.

In the form of my invention shown in FIGURE 3, as the reading member 32 carrying the magnets 62, 64, 66, and 68 moves over the sheet 30 certain ones of the toroids provided between apertures 36 are saturated with the result that the pairs of terminals 40 and 48, 50 and 52, 54 and 56, and 58 and 60 provide output signals which are a binary coded representation of shaft position. The operation of the form of my invention shown in FIGURE 4 is similar with the exception that the coding of the sheet may be any desired code and a parity character 78 is provided for proper operation of the device. FIGURES 5 and 6 illustrate two possible packaging configurations.

It will be seen that I have accomplished the objects of my invention. I have provided an apertured ferrite device in which information is permanently, mechanically incorporated so that it is not affected by stray magnetic fields or by shock. My apertured ferrite device requires no relatively movable contacting members for readout. My apertured ferrite device readily lends itself to unusual packaging configurations.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In an information storage device a plurality of saturable cores, means mounting said cores in spaced relationship to form a column of cores, output windings associated with cores of said column to form a pattern of cores having output windings, said column having an even number of output windings alternately connected in series-opposed relationship, interrogating windings normally inductively coupled to said output windings by said cores, means for applying an interogating signal to said interrogating windings normally to cause said output windings to produce output signals and a member movable past said cores for selectively saturating said cores whereby the output winding of a core adjacent which said member is disposed produces no output signal in response to said interrogating signal.

2. An information storage device including in combination a plurality of saturable cores, means mounting said cores in spaced relationship to form a plurality of rows and columns of said cores, output windings associated with certain ones of said cores to form a coded pattern of cores having output windings, interrogating windings normally inductively coupled to said output windings by said cores, means for applying an interrogating signal to said interrogating windings normally to cause said output windings to provide output signals, a source of saturating magnetic flux, means mounting said flux source for movement relative to said cores and means for moving said source of flux successively past said rows of cores successively to saturate said cores row by row whereby the output windings of a row adjacent which said movable means is disposed provide no output signals and means for moving said movable means successively past said rows.

3. An information storage device including in combination a plurality of saturable cores, means mounting said cores in spaced relationship to form a plurality of rows and columns of said cores, output windings associated with certain ones of said cores to form a coded pattern of cores having output windings, each of said columns having an even number of output windings alternately connected in series-opposed relationship, interrogating windings normally inductively coupled to said output windings by said cores, means for applying an interrogating signal to said interrogating windings normally to cause said output windings to provide output signals, means adapted to be moved past said rows of cores in succession to saturate said cores whereby the output windings of a row adjacent which said movable means is disposed provide no output signals and means for moving said movable means successively past said rows.

4. An information storage device including in combination a plurality of saturable cores, means mounting said cores in spaced relationship to form a plurality of rows and columns of cores in a coded pattern of cores, output windings associated with said cores, interrogating windings normally inductively coupled to said output windings by said cores, means for applying an interrogating signal to said interrogating windings normally to cause said output windings to provide output signals, a source of saturating magnetic flux, means mounting said flux source for movement past said rows of cores successively to saturate said cores row by row whereby the output windings of a row adjacent which said movable means is disposed provide no output signals and means for moving said source of flux successively past said rows.

5. An information storage device including in combination a plurality of saturable cores, means mounting said cores in spaced relationship to form a plurality of rows and columns of cores in a coded pattern, output windings associated with said cores, each of said columns having an even number of output windings alternately connected in series-opposed relationship, interrogating windings normally inductively coupled to said output windings by said cores, means for applying an interrogating signal to said interrogating windings normally to cause said output windings to provide output signals, means adapted to be moved past said rows of cores successively to saturate said cores row by row whereby the output windings of a row adjacent which said movable means is disposed provide no output signals and means for moving said movable means successively past said rows.

6. A device including in combination a sheet formed of ferrite, means providing said sheet with a plurality of apertures arranged in rows and columns, each of said apertures forming a saturable toroid, a plurality of output windings associated with certain ones of said apertures to form a coded pattern of apertures having output windings associated therewith, interrogating windings associated with those apertures having output windings, said toroids normally coupling said interrogating windings and said output windings in inductive relationship, means for applying an interrogating signal to said interrogating windings normally to induce signals in said output windings, a plurality of magnets associated with the respective columns of apertures, said magnets producing a flux for saturating said toroids, and means mounting said magnets in a row for movement along the columns successively to saturate the toroids of said rows whereby the output windings of a toroid adjacent which said magnets are disposed produces no output signal in response to said interrogating signal.

7. An information storage device including in combination a plurality of saturable cores, means mounting said cores in spaced relationship, an even number of output windings carried by respective cores, means alternately connecting said output windings in series-opposed relationship, interrogating windings normally inductively coupled to said output windings by said cores, means for applying an interrogating signal to said interrogating windings normally to cause said output windings to provide output signals, means adapted to be moved past said cores successively to saturate said cores whereby the output winding of a core adjacent which said movable means is disposed provides no output signal and means for moving said movable means past said cores.

8. An information storage device including in combination a cylindrical member of magnetic material, means forming a plurality of saturable cores in said member, said cores being arranged to form axially spaced rings of cores, output windings associated with said cores to form a coded pattern, interrogating windings normally inductively coupled to said output windings by said cores, means for applying an interrogating signal to said interrogating windings normally to cause said output windings to provide output signals, a source of saturating magnetic flux, means mounting said flux source for axial movement with respect to said cylinder and means for moving said source of flux successively past said rings of cores successively to saturate said cores ring by ring whereby the output windings of a core adjacent which said movable means is disposed produces no output signal in response to said interrogating signal.

9. An information storage device including in combination a box-like member of magnetic material, means forming a plurality of saturable cores in said member, said cores being arranged in axially spaced rows, the cores of each row being disposed on the locus of a cross-section of said member, output windings associated with said cores to form a coded pattern, interrogating windings normally inductively coupled to said output windings by said cores, means for applying an interrogating signal to said interrogating windings normally to cause said output windings to provide output signals, a source of saturating magnetic flux, means mounting said flux source for movement relative to said box-like member, and means for moving said source successively past said rows to saturate said cores row by row whereby the output winding of a core adjacent which said source is disposed produces no output signal in response to said interrogating signal.

References Cited by the Examiner

UNITED STATES PATENTS

| | | | |
|---|---|---|---|
| 2,740,110 | 3/56 | Trimble | 340—174 X |
| 2,814,031 | 11/57 | Davis | 340—174 |
| 2,820,216 | 1/58 | Grottrup | 340—174 |
| 2,883,604 | 4/59 | Mortimer | 340—174 |
| 2,902,678 | 9/59 | Kosoncky | 340—174 |
| 2,974,316 | 3/61 | Guidal et al. | 340—347.3 |
| 2,994,069 | 7/61 | Rajchman | 340—174 |
| 3,041,598 | 6/62 | Betts | 340—347 |

IRVING L. SRAGOW, *Primary Examiner.*